May 10, 1932.  K. E. PEILER  1,857,791
METHOD AND APPARATUS FOR FORMING GLASS TUBING FROM GLASS BILLETS
Filed Dec. 11, 1928
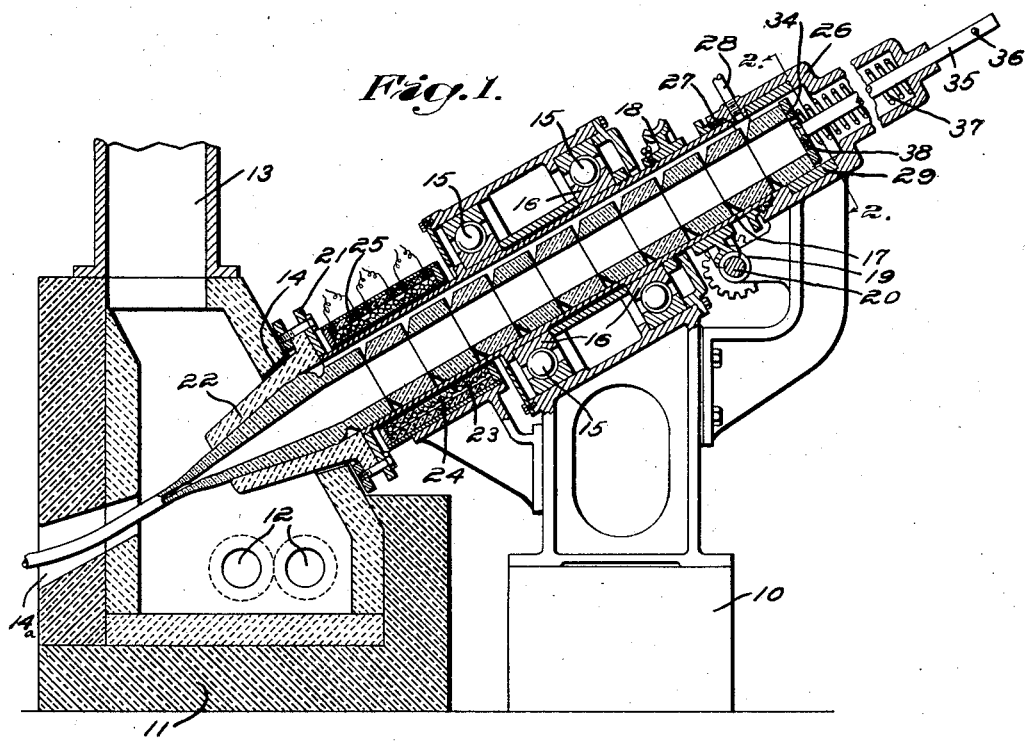
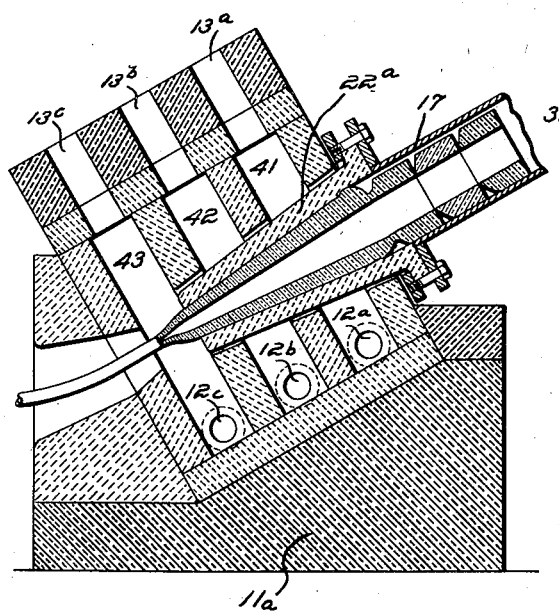
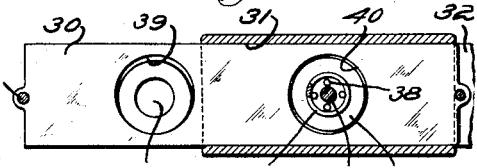
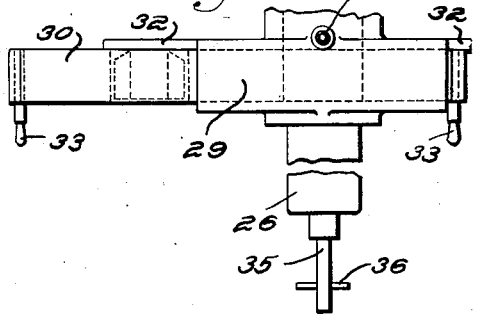
Witness.
Winslow B. Thayer
Inventor:
Karl E. Peiler,
by Arthur D. Brown
Attorney Patented May 10, 1932

1,857,791

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR FORMING GLASS TUBING FROM GLASS BILLETS

Application filed December 11, 1928. Serial No. 325,202.

My invention relates to the manufacture of glass tubing and cane, more particularly to the manufacture of such tubing from pressed billets.

It has heretofore been proposed to use annular glass billets in the manufacture of glass tubing and cane by threading such billets upon a vertical mandrel about the lower end of which a high temperature is maintained. As the glass is softened or melted, the tubing or cane is drawn from the end of the mandrel in the usual way. This method fails to assure an even and proper distribution of the glass. Such proposals have not, to the applicant's knowledge, included the provision of suitable apparatus or an entirely practical process for forming glass tubing and cane from preformed billets.

The object of the present invention is to provide a practical method and efficient apparatus by which glass tubing and cane may be continuously formed from a continuous series of glass billets. In accordance with the present invention, I provide an inclined hollow metal member, provided at its lower end with a refractory nozzle or funnel which projects into a suitable heating furnace. For the manufacture of tubing, I provide means for maintaining a superatmospheric pressure within the tubular member and funnel, and means for feeding glass billets into the member without reducing the superatmospheric pressure. In drawing cane, it is not necessary to maintain superatmospheric pressure in the tubular member. Means are also provided for rotating the tubular member, for preheating the billets as they approach the funnel-shaped end thereof, and for reducing the billets to workable consistency in the funnel.

As the successive billets are fed downwardly, they are rotated with the tubular member and are passed through a preheating zone at which they are heated to a temperature just below that at which they would stick to the metal member. They then proceed into the refractory funnel member, where they are more highly heated and are reduced to soft or molten glass which forms in a layer about the interior walls of the funnel. When making tubing, the glass is prevented from collapsing by the maintenance of the superatmospheric pressure aforesaid and is drawn from the small or lower end of the funnel to form tubing in the usual manner. Annular billets are used in making tubing, while solid billets may be used in the manufacture of cane. These and other novel and advantageous features will more fully appear from the attached specification and claims.

The mechanical features of my invention are shown in the attached drawings, in which:

Figure 1 is a view in vertical section of one form of my novel apparatus as used for tube manufacture;

Fig. 2 is an end section taken on the line 2—2 of Fig. 1, showing the billet feeding mechanism in detail;

Fig. 3 is a plan view of the billet feeding apparatus; and

Fig. 4 shows a modified form of the furnace and refractory funnel.

Referring to Figs. 1 to 3, 10 is a standard or base supporting the cylinder and associated mechanism, 11 is a suitable furnace or heating chamber for supplying heat to the lower or funnel portion of the apparatus and provided with suitable openings 12 for burners and with a chimney 13. The furnace is also provided with openings 14 and 14a respectively adapted to receive the funnel portion of the apparatus and to permit the drawing of the tubing or cane therefrom.

The standard 10 carries suitable ball bearings 15 adapted to carry bearing members 16 attached to an inclined metallic hollow cylinder 17. This cylinder 17 also carries a suitable worm wheel 18 adapted to mesh with a worm 19 which is mounted upon a shaft 20, driven constantly from any suitable source of power (not shown) to impart continuous rotation to the cylinder 17. The lower end of the inclined cylinder 17 is provided with an enlarged head 21 to which is fastened a funnel-shaped refractory member 22 which projects through the opening 14 into the furnace. The lower portion of the metallic tube is provided with heating means, here shown as the electric resistances 23, 24 and 25. Preferably, these resistances are provided with separately controlled circuits so that heat supplied to different sections of the member 17 may be separately and individually controlled. These resistances are carried on a suitable bracket on the support 10 and are electrically insulated from the metallic tube by a layer of material, such as fused alumina, which has high electrical insulating qualities when heated.

The upper end of the cylinder 17 revolves within a hollow stationary head structure 26. The connection between the cylinder 17 and the head 26 is made air tight by a suitable stuffing-box arrangement 27. The head structure 26 is supported by a bracket on the support 10 and is provided with a pipe 28 for the admission of compressed air.

The head 26 is also provided with the billet feeding mechanism, generally indicated at 29. This feeding mechanism comprises a slide-box or slidable feed member 30 adapted to slide in a transverse opening 31 in the head 26. The slide-box 30 is provided with a pair of pockets or openings 39 and 40, each adapted to receive a billet and carry it into line with the interior of the cylinder 17. The fit and size of the surfaces of the box 30 is such as to constitute a substantially air tight connection. The lower wall of the slide way 31 may be extended, as at 32, to form a wall for the pockets 39 and 40 when the pockets are in their outer position to receive a billet. The slide-box 30 may be provided with suitable stops 33 so arranged as to accurately position the billets centrally of the cylinder 17.

The head 26 also carries a pusher piston 34, having a rod 35 which extends outwardly through the closed end of the head 26. This rod is provided with a pin or handle 36 for the manual operation of the pusher. If desired, the pusher may be forced forwardly by a spring 37. By this means, the billets introduced into the head by the slide-box 30 may be pushed forward and against the preceding billet and the series of billets may be constantly urged toward the furnace. The piston head 34 is provided with suitable openings 38 to permit the passage of compressed air from the pipe 28 into the annular opening in the series of billets and into the refractory funnel 22 to prevent the collapse of the molten glass formed on the walls of the funnel when the apparatus is used for tubing.

To assure against the trapping of air in the glass during the welding and softening of two adjacent billets, I prefer to provide a billet with at least one rounded or beveled end, so that the welding operation will take place from the interior outwardly and the air which might otherwise be entrapped be given an opporunity to escape. The billets may be formed in any well-known way, but I prefer, when annular billets are used, to form them in the manner set forth and described in my copending United States application for Letters Patent, Serial No. 325,203, filed Dec. 11, 1928.

In the modified form of my apparatus shown in Fig. 4, I have shown the funnel shaped member 22 of Fig. 1 as replaced by the longer and less sharply tapered member 22a. I have also shown a furnace 11a divided into a series of separate heating chambers 41, 42 and 43, respectively provided with individual separately controllable burners 12a, 12b, 12c and with individual stacks or chimneys 13a, 13b, 13c. Such an apparatus may prove advantageous in softening the billets and maintaining the glass at a consistency most desirable for a fabrication of a particular type of tubing or cane.

The operation of my improved apparatus is as follows: A continuous succession of billets is provided in the tubular member 17 by feeding such billets into the head 26 by the alternate use of the pockets 39 and 40 of the slide-box 30. The billets are constantly urged down the incline of the tubular member 17 and are constantly rotated at the desired speed by rotation of that member. As they approach the lower end of the metallic member 17 they are preheated by the resistances 23, 24 and 25, being gradually brought up from a lower to a higher temperature by the increasing heating effect of the resistances. This preheating should not raise the temperature of the billets to that at which they will stick to the metallic tube member 17, as it is my purpose that there be always a sliding relationship between that member and the billets. After passing the resistances, the successive billets pass into the refractory funnel 22 where they are further heated to form a layer of soft or molten glass on the interior walls of the funnel. Tubing or cane is drawn from the lower end of the funnel in the usual manner. When making tubing, superatmospheric pressure is provided in the tubular member and in the annular opening formed in a series of billets, as above described, which prevents collapse of the tube as it is being drawn from the end of the funnel and before it hardens.

The apparatus shown and described herein may obviously be modified in numerous particulars without departing from the spirit of my invention as set forth in the appended claims.

I claim:

1. The method of forming glass tubing which comprises, forming a succession of annular billets of pressed glass, successively melting the billets to form a layer of glass upon the interior of a hollow rotating member, maintaining superatmospheric pressure within the member, and continuously drawing glass tubing from the lower end of the member.

2. The method of forming glass tubing which comprises, forming a continuous series of annular glass billets arranged in end to end relation within a constantly rotating tubular member, melting the successive billets as they approach the lower end of the member and thereby forming a layer of molten glass of workable consistency upon the interior of the member, maintaining superatmospheric pressure within the member, and continuously drawing glass tubing from the end of the member.

3. The process of forming glass tubing which comprises, maintaining a continuous succession of annular pressed glass billets arranged in end to end relation, continuously rotating the succession about an axis inclined from the vertical, maintaining superatmospheric pressure in the interior of the series of the billets, continuously melting the billets to form a layer of glass of workable consistency upon the lower end of a rotating tubular member, and continuously drawing glass tubing from the end of the member.

4. The method of forming glass tubing which comprises, continuously rotating a tubular inclined member, continuously supplying compressed air thereto to maintain the interior thereof at a superatmospheric pressure, feeding a succession of annular glass billets into said tubular member while maintaining the superatmospheric pressure therein, moving the billets successively into a heated funnel-shaped member, melting the billets therein to form glass of workable consistency and drawing glass tubing from the end of said funnel-shaped member.

5. The method of forming glass tubing which comprises, forming a continuous series of annular pressed glass billets placed in end to end relation, moving said series endwise into a preheating zone while rotating the same about its axis, preheating the billets in such zone, further moving the said billets into a melting zone, melting the successive billets to form glass, spreading the glass so formed in an annular layer about the inner surface of a hollow member, and drawing tubing therefrom.

6. Apparatus for forming glass tubing comprising a constantly rotating cylindrical member, means for maintaining superatmospheric pressure therein, means for feeding annular billets of glass thereinto to form a continuous succession of billets in end to end relation therein, means for rotating the hollow member, a melting chamber, means for moving the billets successively into the melting chamber whereby the billets are melted, and means for drawing glass tubing from glass so melted.

7. Apparatus for forming glass tubing comprising a hollow member adapted to receive annular pressed glass billets in its interior, means for rotating the member, means for supplying the member continuously with superatmospheric pressure, means for melting the billets to form plastic glass, and means for drawing tubing therefrom.

8. Apparatus for forming glass tubing which comprises, a cylindrical member for formed glass annular billets having an upper or guiding portion formed of metal and a lower portion formed of refractory material, means for maintaining superatmospheric pressure within the member, means for continuously rotating the member, means for feeding the billets to the interior of said member, means associated with the metallic portion of the member for preheating the successive billets to a temperature just below that at which the billets will stick to such portion of the member, means for heating the refractory portion of the member to reduce the billets to glass of workable consistency, and means for drawing glass tubing from the glass so formed.

9. Apparatus for forming glass tubing comprising, a hollow member adapted to receive glass billets and mounted for rotation about an axis inclined from the vertical, means for rotating the member, means for maintaining superatmospheric pressure within the member, means for feeding billets succesively into the member without destroying the superatmospheric pressure, means for advancing the billets downward within the container and into a zone of heat, means for preheating the billets, other means for melting the preheated billets to form molten glass of workable consistency, and means for drawing tubing therefrom.

10. Apparatus for forming glass tubing comprising a rotating cylindrical member, and means for feeding glass billets into said cylindrical member for longitudinal movement therein in a continuous series, said feeding means comprising a stationary head receiving an end portion of said cylindrical member and having a substantially air-tight engagement therewith, said head having a feed opening, means for introducing superatmospheric pressure into the head, and a slidable feed member in air-tight engagement with the walls of said opening for receiving said billets outside of said head and for positioning them inside of the head and in alignment with said cylindrical member without permitting escape of superatmospheric pressure from the head.

Signed at Hartford, Connecticut this 7th day of December, 1928.

KARL E. PEILER.